(12) United States Patent
Kawaguchi

(10) Patent No.: US 7,559,468 B2
(45) Date of Patent: Jul. 14, 2009

(54) READER/WRITER SECURE MODULE ACCESS CONTROL METHOD

(75) Inventor: Kyoko Kawaguchi, Tokyo (JP)

(73) Assignee: Panasonic Corporation, Osaka (JP)

( * ) Notice: Subject to any disclaimer, the term of this patent is extended or adjusted under 35 U.S.C. 154(b) by 268 days.

(21) Appl. No.: 11/569,475

(22) PCT Filed: May 23, 2005

(86) PCT No.: PCT/JP2005/009378

§ 371 (c)(1),
(2), (4) Date: Nov. 21, 2006

(87) PCT Pub. No.: WO2005/114561

PCT Pub. Date: Dec. 1, 2005

(65) Prior Publication Data

US 2007/0221725 A1 Sep. 27, 2007

(30) Foreign Application Priority Data

May 24, 2004 (JP) ............................. 2004-152943

(51) Int. Cl.
*G06K 7/00* (2006.01)
(52) U.S. Cl. ...................... 235/435; 235/380; 235/492; 235/451
(58) Field of Classification Search .................. 235/435, 235/492, 451, 380, 382, 375
See application file for complete search history.

(56) References Cited

U.S. PATENT DOCUMENTS

| | | | |
|---|---|---|---|
| 5,929,414 A | 7/1999 | Saitoh | |
| 6,250,557 B1 | 6/2001 | Forslund et al. | |
| 6,257,486 B1 * | 7/2001 | Teicher et al. | 235/380 |
| 6,863,220 B2 * | 3/2005 | Selker | 235/492 |
| 6,955,299 B1 * | 10/2005 | Pathmasuntharan et al. | 235/492 |
| 2003/0132301 A1 | 7/2003 | Selker | |

(Continued)

FOREIGN PATENT DOCUMENTS

CN 1164714 A 11/1997

(Continued)

OTHER PUBLICATIONS

English Language Abstract of JP 2002-150236.

(Continued)

*Primary Examiner*—Edwyn Labaze
(74) *Attorney, Agent, or Firm*—Greenblum & Bernstein P.L.C.

(57) ABSTRACT

A secure module holder is (SH) capable of preventing an unauthorized reading of information on a secure module (SM). The SH holds one or more SM. The SH controls non-contact communication with a reader/writer RW of the SM and includes non-contact communication section, contact communication section with the SM, access controller performing authentication processing with the RW, and a control unit. The control unit performs a process for invalidating the non-contact communication means section of the SM inserted, a process for causing the access controller to perform an authentication process with the RW according to a card application selection request of the RW, and a process of permitting the RW to access the card application of the SM if the authentication is successful. The number of SM held by the SH and the card application stored in them cannot be known by the RW which has not completed the authentication process.

5 Claims, 16 Drawing Sheets

U.S. PATENT DOCUMENTS

2004/0117618 A1   6/2004   Kawaguchi et al.
2007/0122941 A1*  5/2007   Ota et al. .................... 438/107
2007/0221725 A1*  9/2007   Kawaguchi ................ 235/382

FOREIGN PATENT DOCUMENTS

| JP | 9-305736    | 11/1997 |
| JP | 2002-150236 | 5/2002  |
| JP | 2003-076954 | 3/2003  |
| JP | 2004-500607 | 1/2004  |
| WO | 00/11624    | 3/2000  |

OTHER PUBLICATIONS

English Language Abstract of JP 2004-500607.
English Language Abstract of JP 2003-076954.
English Language Abstract of JP 9-305736.
U.S. Appl. No. 10/597,488 to Kawaguchi, filed Jul. 27, 2006.
English language Abstract of CN 1164714 A, Nov. 12, 1997.

* cited by examiner

| CARD APPLICATION ID (AID) | RW AUTHENTICATION INFORMATION | AUTHENTICATION METHOD |
|---|---|---|
| 1xxxxxxx.... | RW PUBLIC KEY | CHALLENGE RESPONSE |
| 01xxxxxxx.... | AUTHENTICATION CARD APPLICATION | INTER-APPLICATIONS AUTHENTICATION |
| 001xxxx.... | KEY SHARED WITH RW | CHALLENGE RESPONSE |
| 0001xxxx.... | NONE (USE DEFAULT AUTHENTICATION INFORMATION STORED IN HOLDER) | HOLDER DEFAULT AUTHENTICATION METHOD |
| ..... | ..... | ..... |

FIG.10

READER/WRITER SECURE MODULE ACCESS CONTROL METHOD

TECHNICAL FIELD

The present invention relates to a program for implementing a method of controlling access by a reader/writer (hereinafter, abbreviated as "RW") to a secure module such as an IC card and an apparatus and secure module used to implement the method, and is intended to prevent information of the secure module from being illegally read.

BACKGROUND ART

In recent years, an IC card has been widely used as an electronic settlement card, commutation ticket, event ticket, credit card or the like. Recently, along with the improvement of miniaturization technologies, IC card having relatively large-volume memory capacity has been created and by storing a plurality of card applications executing card services, a single IC card can be used as a multi-application card corresponding to a plurality of applications.

There are two types of IC card communication schemes; a contact communication whereby recorded information is read and written with an RW contacting an electric contact of the IC card and a non-contact communication whereby information is exchanged through wireless communication and no physical contact with the RW is required. Recently, an IC card capable of both contact communication and non-contact communication is mounted in a mobile terminal apparatus and this mobile terminal is also used as a substitute for an electronic purse or commutation ticket.

FIG. 1 schematically shows a configuration of secure module 20 such as an IC card and RW 10 performing a non-contact communication. Secure module (SM) 20 is provided with SM local wireless communication section 21 to perform a non-contact communication, a plurality of card applications 23 and control section 22 that controls the operation of secure module 20, and RW 10 is provided with RW local wireless communication section 11 that performs a non-contact communication with SM local wireless communication section 21.

RW 10 on standby periodically sends out a request signal from RW local wireless communication section 11 to detect approaching of secure module 20 to a communication area. When the user holds up secure module 20 over RW 10, secure module 20 which has approached the communication area of RW 10 responds to a request signal through SM local wireless communication section 21 and a non-contact communication between RW local wireless communication section 11 and SM local wireless communication section 21 starts. Next, RW 10 selects card application 23, and selected card application 23 and RW 10 proceed with processing of execution of a service.

Unlike a contact communication, however, a non-contact communication has a possibility that a plurality of secure modules 20 may go into the communication area of RW 10 and when a plurality of secure modules 20 communicate with RW 10 simultaneously, it is necessary to communicate by identifying cards. Therefore, ISO14443-3 defying the international standard for a non-contact and proximity type IC card prescribes an anticollision procedure as a processing procedure when a plurality of secure modules 20 exist simultaneously. (See, Non-Patent Document 1 below)

FIG. 2 shows an anticollision procedure on a B-type card and a card application selection procedure prescribed in ISO7816-4. An RW periodically transmits a request command (REQB) to detect approaching of an IC card to the communication area. Upon receiving the request command (REQB), the IC card which approached the communication area of the RW returns a response (ATQB) including the own identification number (PUPI) to this REQB. The apparatus on the RW side sets a card identifier (CID) to the IC card which responded, assigns PUPI to an ATTRIB command including CID information and transmits it. The IC card becomes active (activated state) when its identification number (PUPI) is included in the ATTRIB command and returns a response (ATQB) to the RW. After that, the IC card responds only to commands assigned the CID which has been set in the IC card.

The RW transmits a Select file which specifies a card application by an identification number (AID) to the IC card, and the IC card starts the selected card application and returns a response (ATQB) to the RW.

[Non-Patent Document 1] "Basis and Application of Security IC Card—Passport for e-Business" (authors: Hiroyasu Oda, Koji Ayukawa, Hiroshi Karube, edited by Card Marketing Study Group, issued Apr. 27, 2000, published by C. media Co., Ltd.)

DISCLOSURE OF INVENTION

Problems to be Solved by the Invention

However, according to this procedure for anticollision and card application selection, a card application which is stored in the IC card may be known to the RW which has not been authenticated yet, and there is a fear that the privacy of the IC card user may be infringed and the user may suffer unexpected damage.

Also, in the near future, a mode will be considered where various services may be available by inserting a plurality of chip-shaped secure modules in a holder which functions as an electronic purse and holding up this holder to various RWs with the secure modules inserted in the electronic purse. In this case, however, the number of secure modules inserted in the electronic purse and card applications stored in each secure module may be known to the RW which has not been authenticated yet through the anticollision procedure and the card application selection procedure and there is a fear of privacy infringement.

The present invention is intended to solve such conventional problems and it is an object of the present invention to provide a program for implementing a method of preventing illegal reading of information on a secure module and an apparatus (holder) and secure module used for implementation of the method.

Means for Solving the Problem

Thus, the present invention configures a program which prescribes operation of a control section of a secure module holder that holds one or a plurality of secure modules storing at least one card application and having a non-contact communication section and controls a non-contact communication with an RW of this secure module so as to cause this control section to execute a step of disabling the non-contact communication section of the secure module before access to the card application stored in the secure module is requested from the reader/writer, a step of selecting an authentication application according to a card application selection request of the reader/writer and executing authentication processing with the reader/writer and a step of permitting the RW to access the card application stored in the secure module only when this authentication processing succeeds.

Furthermore, as a step when the authentication processing succeeds, the present invention enables the non-contact communication section of the secure module which has been disabled so as to permit the RW to access the card application stored in the secure module through this non-contact communication section.

Furthermore, as a step when the authentication processing succeeds, the present invention permits the RW to access the card application stored in the secure module through the non-contact communication section of the secure module holder.

Therefore, an RW that has not completed the authentication processing yet cannot know the number of secure modules held in this secure module holder and the card applications stored in the secure module.

Furthermore, the present invention configures a program which prescribes operation of a control section of a secure module that stores at least one card application and has a non-contact communication section with an RW so as to cause this control section to execute a step of selecting an authentication application according to a card application selection request of the RW and executing authentication processing with the RW and a step of permitting the RW to access the card application stored in the secure module only when this authentication processing succeeds.

Therefore, an RW that has not completed the authentication processing yet cannot know the card application stored in this secure module.

Furthermore, the present invention provides a secure module holder that holds one or a plurality of secure modules storing at least one card application and having a non-contact communication section and controls a non-contact communication of this secure module with an RW, comprising the non-contact communication section that performs the non-contact communication with the RW, a contact communication section that performs a contact communication with the secure module, an access control section that performs authentication processing with the RW and a control section that controls operation of the secure module holder, and configures this control section so as to execute a step of disabling the non-contact communication section of the secure module before access to the card application stored in the secure module is requested from the RW, a step of causing the access control section to perform authentication processing with the RW according to a card application selection request of the RW and a step of permitting the RW to access the card application stored in the secure module only when this authentication processing succeeds.

Furthermore, before access to the card application stored in the secure module is requested from the RW, this control section is configured so as to execute a step of disabling the non-contact communication section of the secure module, a step of causing the access control section to perform authentication processing with the RW according to the card application selection request of the RW and a step of enabling the non-contact communication section of the secure module which has been disabled only when this authentication processing succeeds and permitting the RW to access the card application stored in the secure module through the non-contact communication section of the secure module.

Furthermore, before access to the card application stored in the secure module is requested from the RW, this control section is configured so as to execute a step of disabling the non-contact communication section of the secure module, a step of causing the access control section to perform authentication processing with the RW according to the card application selection request of the RW and a step of permitting the RW to access the card application stored in the secure module through the non-contact communication section and the contact communication section of the secure module holder only when this authentication processing succeeds.

Furthermore, the present invention sets an application ID which is different from that of the card application in the authentication application of the access control section that performs authentication processing with the RW or an application ID which is identical to that of the card application.

An RW that has not completed the authentication processing yet cannot know the number of secure modules stored in this secure module holder and the card application stored in the secure module.

Furthermore, the present invention provides a secure module that stores at least one card application, comprising a non-contact communication section that performs a non-contact communication with an RW, an access control section that performs authentication processing with the RW and a control section that controls operation of the secure module, and causes this control section to execute a step of causing the access control section to perform authentication processing with the RW according to a card application selection request of the RW and a step of permitting the RW to access the card application stored in the secure module only when this authentication processing succeeds.

Furthermore, the present invention sets an application ID which is different from that of the card application in the authentication application of the access control section that performs authentication processing with the RW or an application ID which is identical to that of the card application.

An RW that has not completed the authentication processing yet cannot know the card application stored in this secure module.

Advantageous Effect of the Invention

The program of the present invention can prevent the number of secure modules stored in a secure module holder and card applications stored in the secure modules from being known to an RW which has not been authenticated and can thereby protect privacy of the user.

Furthermore, the secure module holder of the present invention can prevent the number of secure modules stored and card applications stored in the secure modules from being known to an RW which has not been authenticated.

Furthermore, the secure module of the present invention can prevent card applications stored from being known to an RW which has not been authenticated.

BRIEF DESCRIPTION OF DRAWINGS

FIG. 10 shows a data structure of access control information according to Embodiment 6 of the present invention;

BEST MODE FOR CARRYING OUT THE INVENTION

The following embodiments will describe disabling of a local wireless function provided for a secure module, but the present invention is also applicable when other communication functions such as Bluetooth, Wireless LAN, LAN and wireless public network are provided.

Embodiment 1

Embodiment 1 of the present invention will describe a method of preventing information of a secure module stored in an electronic purse (secure module holder) from being known to an RW which has not completed authentication yet.

Figure 1:
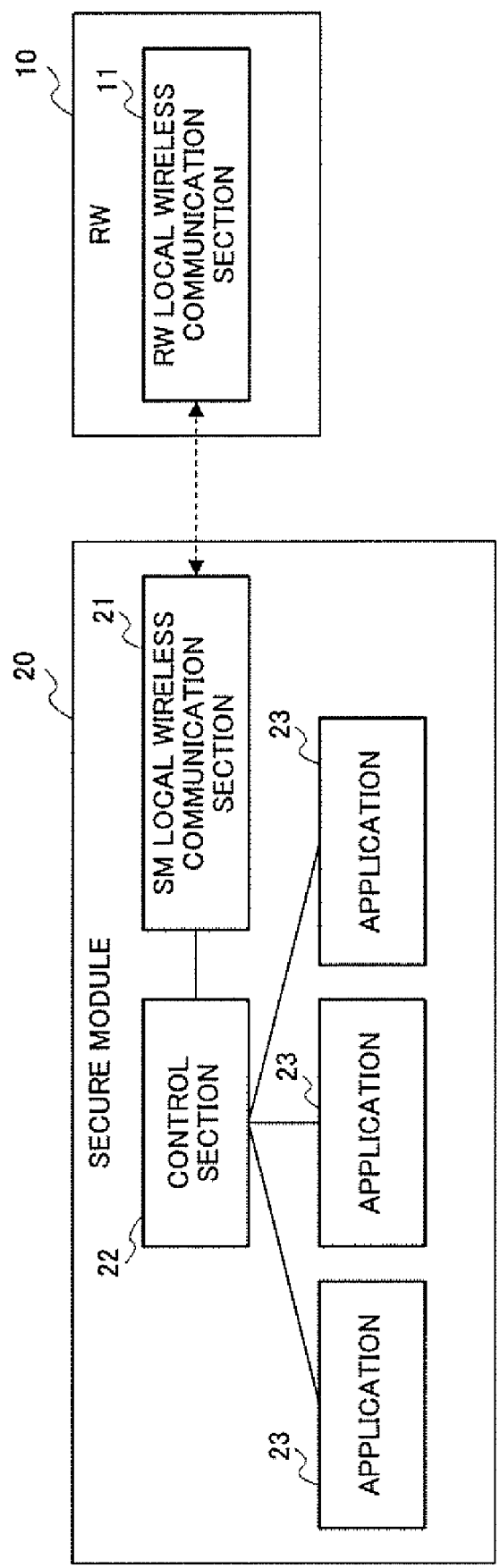
FIG. 1 is a block diagram showing a configuration of a conventional secure module and RW.
Figure 2:
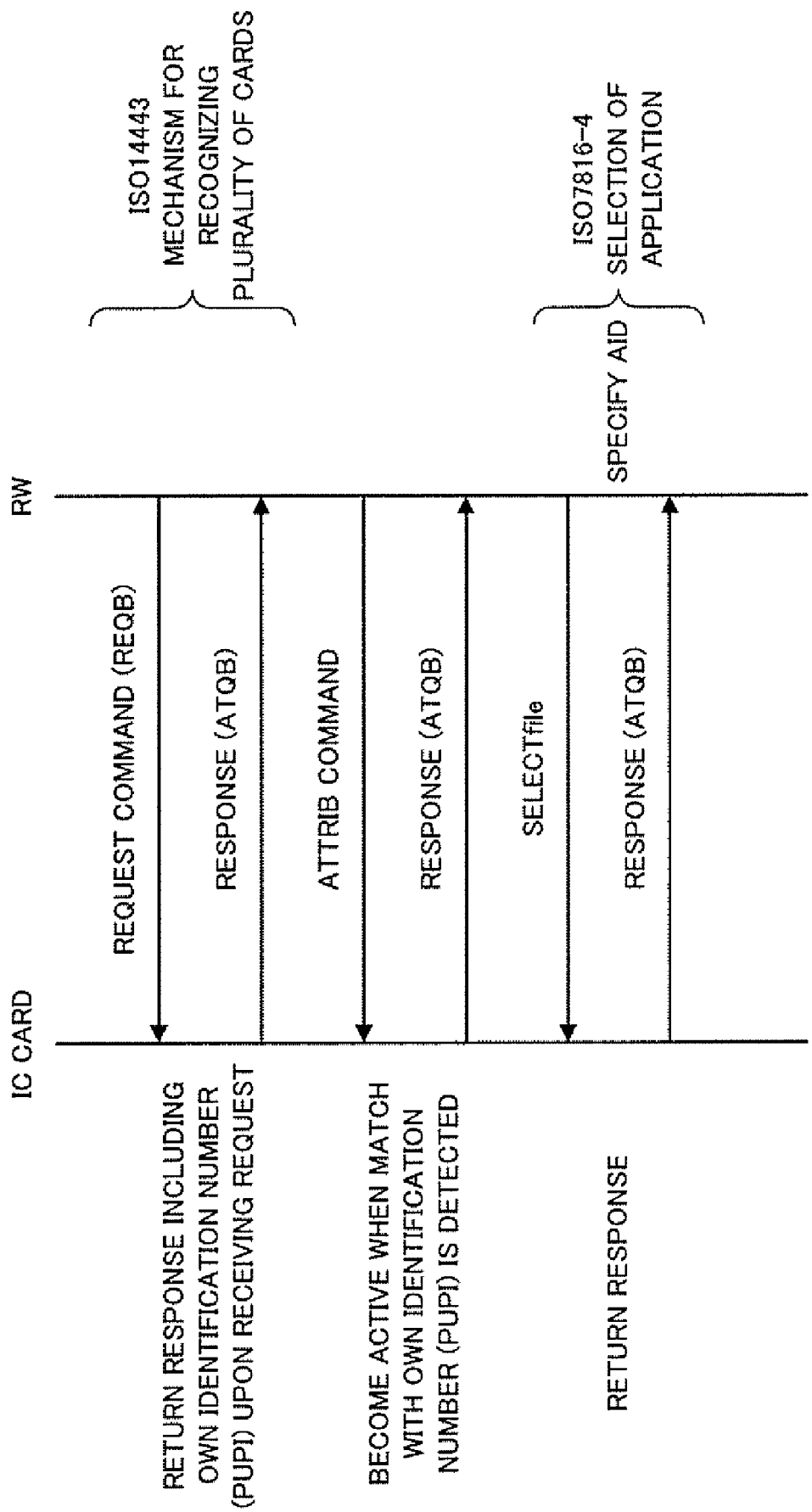
FIG. 2 is a flow chart showing anticollision steps and application selection steps.
Figure 3:
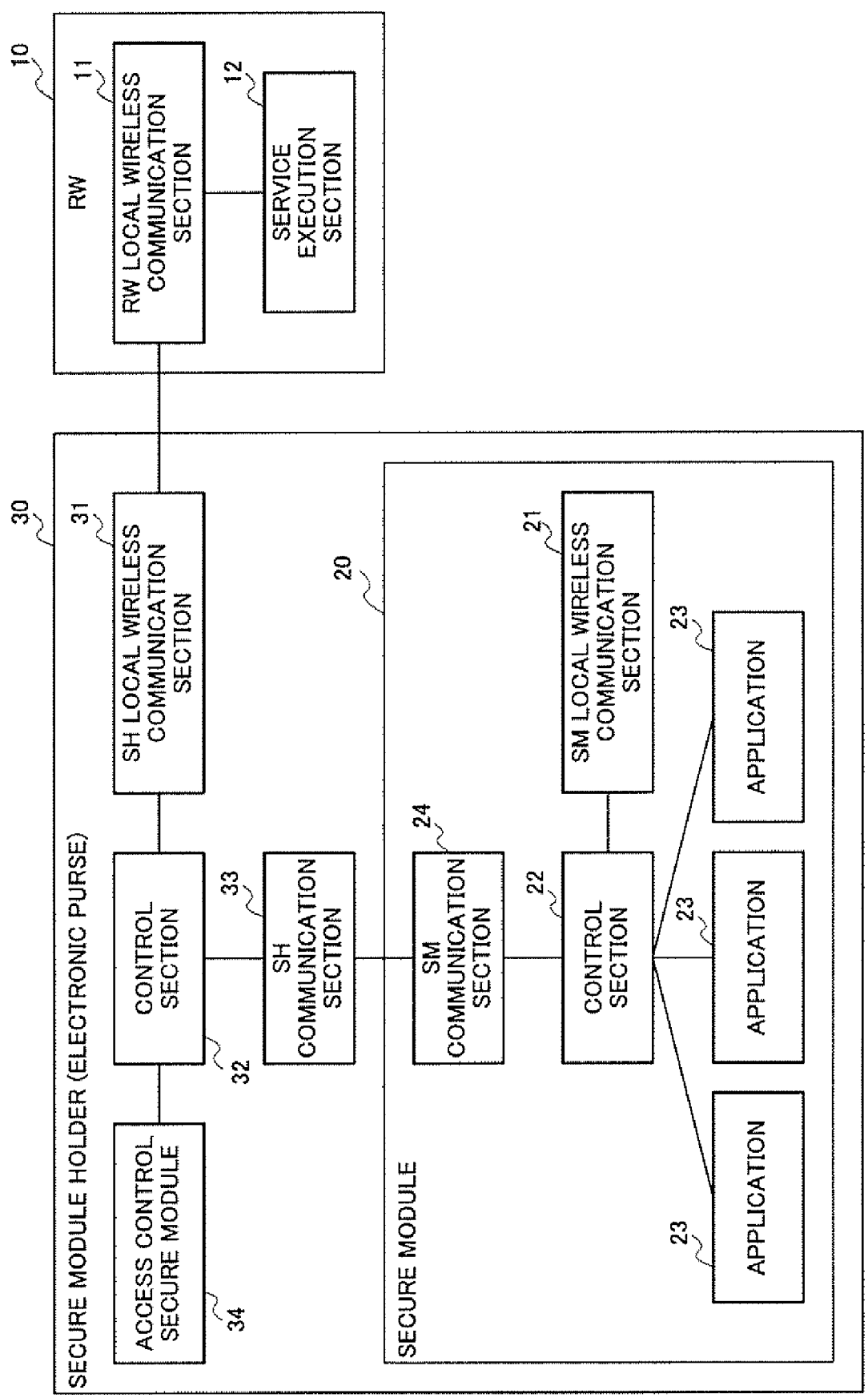
FIG. 3 is a block diagram showing a configuration of a secure module holder according to Embodiment 1 of the present invention.

FIG. 3 shows a configuration of secure module holder (SH) 30 and RW 10 which implement this method. Secure module holder 30 is provided with SH local wireless communication section 31 that is a non-contact communication section with RW 10, SH communication section 33 that is a contact communication section with inserted secure module 20, access control secure module 34 that stores an authentication card application to authenticate RW 10 that accesses card application 23 of secure module 20 and control section 32 that controls the operation of secure module holder 30. Furthermore, one or a plurality of secure modules 20 inserted in secure module holder 30 is provided with SM local wireless communication section 21 that is a non-contact communication section, a plurality of card applications (service applications) 23, SM communication section 24 that is a contact communication section with secure module holder 30 and control section 22 that controls the operation of secure module 20.

Furthermore, RW 10 is provided with RW local wireless communication section 11 that is a non-contact communication section and service execution section 12 that specifies service application 23 of secure module 20 and executes a service.

This RW 10 performs mutual authentication processing with an authentication card application stored in access control secure module 34 of secure module holder 30, and access to secure module 20 becomes possible only when the authentication succeeds.

Access control secure module 34 may be directly built in secure module holder 30 or may also be stored in a module which is physically removable from secure module holder 30 (a different module from secure module 20 in FIG. 3 is assumed).

Furthermore, it is also possible to perform access control over a card application mounted in secure module 20 and stored in another secure module.

Moreover, when access control secure module 34 is removable, it is possible to perform access control in a pattern which differs according to the type of secure module 20 owned by the user. That is, when access control secure module 34 is built in secure module holder 30 in advance, it is possible to perform access control over only a card application set depending on the selection by the manufacturer of secure module holder 30 before shipment of secure module holder 30, but if access control secure module 34 is removable, it is possible to change access control secure module 34 to be inserted in secure module holder 30 according to the card application to be used.

As another case of usage, when the user always carries around secure module holder 30 with a plurality of modules containing card applications inserted therein, it is possible to assume a case where the user has two access control secure modules 34 and puts only access control information for a company on a normal business day (for example, key of the house, commutation ticket, employee ID, authentication information of corporate credit card) in one access control secure module 34 while preventing other card applications from being used and puts only access control information for holidays (for example, private card application such as key of the house (common), personal credit card, video membership card, key of a cottage) in other access control secure module 34 while preventing other card applications from being used, and switches between two access control secure modules 34 according to an environment in which the user uses the card applications. It is also possible to include a calendar function in secure module holder 30 and automatically switch between the normal business day mode and night/holiday mode.

Furthermore, secure module holder 30 may also be provided with a reporting section (LED, speaker, liquid crystal screen may be assumed as example of specific members) to report the current mode to the user. For example, switching between modes may be reported by means of light, sound or color, and the current mode may be displayed using this reporting section. Furthermore, currently available card applications may also be displayed.

As shown in FIG. 10, access control secure module 34 of secure module holder 30 stores access control information in which RW authentication information used for authentication of RW 10 and authentication method in correspondence with AID of card application 23 of each secure module 20 and the authentication application authenticates RW 10 using the RW authentication information of the access control information. The method of setting access control information in access control secure module 34 will be described in detail in Embodiment 6.

Furthermore, SM local wireless communication section 21 of secure module 20 inserted in secure module holder 30 is disabled while it is inserted insecure module holder 30 (SH local wireless communication section 31 is given priority) and when RW 10 which has succeeded in authentication communicates with secure module 20, communication is carried out through RW local wireless communication section 11, SH local wireless communication section 31, SH communication section 33 and SM communication section 24.

Operations of such series are controlled by control section 32 composed of a CPU of secure module holder 30, and control section 32 executes this control operation according to a program.

Figure 4:
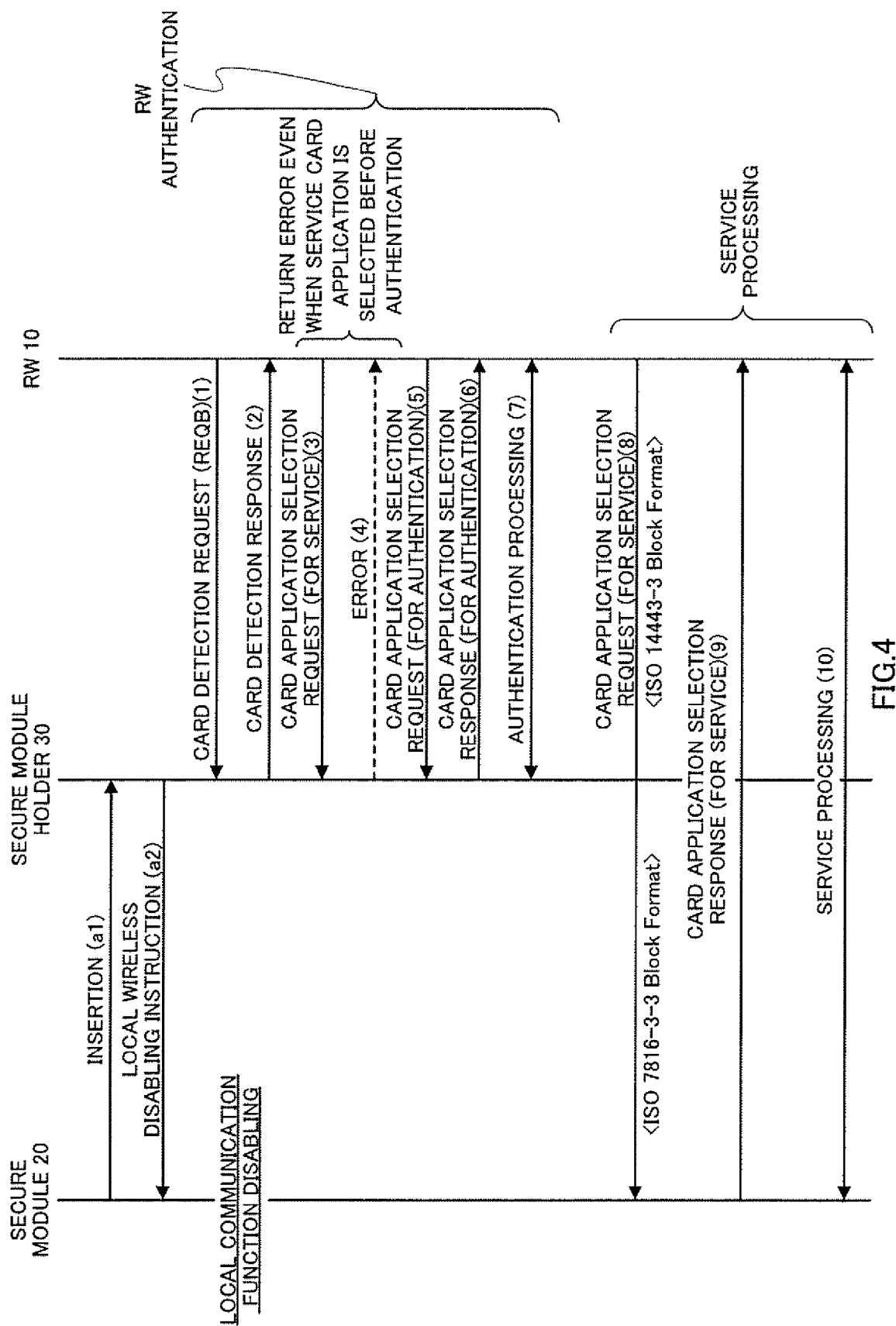
FIG. 4 is a flow chart showing RW access limitation steps to the secure module of the secure module holder according to Embodiment 1 of the present invention.

FIG. 4 shows processing steps in this case. In FIG. 4, the order of the processing is shown by numbers in parentheses (the same will apply to other flow charts). Here, a case where AID of service application 23 and AID of the authentication application which performs authentication processing for the service application are set separately will be explained.

When secure module 20 is inserted in secure module holder 30 (a1), control section 32 of secure module holder 30 sends a local wireless disabling instruction for disabling the local wireless communication function of secure module 20 (gives priority to SH local wireless communication section 31) to secure module 20 (a2) and control section 22 of secure module 20 disables SM local wireless communication section 21.

Here, a case has been described in conjunction with an example where control section 22 of secure module 20 disables SM local wireless communication section 21 after receiving a local wireless disabling instruction, but in addition to this, control section 22 may disable SM local wireless communication section 21 when secure module 20 is connected to secure module holder 30 and receives a power supply from secure module holder 30. As a result, after secure module 20 is connected to secure module holder 30 and the power supply is received, even if the power supply is stopped for some reason before a local wireless disabling instruction is received, it is possible to prevent service application 23 stored in secure module 20 from being known to outside RW 10 which has not been authenticated yet.

On the other hand, when the power supply stops after the disabling has been completed, even if an attempt is made to use secure module 20 as a single unit, SM local wireless communication section 21 remains disabled, and therefore SM local wireless communication section 21 cannot be used in that condition. Therefore, when control section 22 detects cutoff of power from secure module holder 30, it is possible to use secure module 20 as a single unit even after the power cutoff by enabling SM local wireless communication section 21.

The start of power supply and power cutoff can be detected from a specific pin terminal for connection with secure module holder 30 provided for secure module 20.

Furthermore, a pressure sensor may be provided for secure module 20 to execute disabling processing when a pressure of a predetermined threshold or higher is applied.

RW 10 periodically transmits a request command (REQB) to detect approaching of the secure module to the communication area (1). When the user holds up secure module holder 30 over RW 10 and SH local wireless communication section 31 receives REQB, control section 32 of secure module holder 30 replies through SH local wireless communication section 31 in accordance with an anticollision procedure (2).

When RW 10 specifies AID of a service application and requests a selection of a card application (3), control section 32 of secure module holder 30 returns an error (4) as authentication processing for RW 10 has not been completed yet.

RW 10 specifies AID of an authentication application which corresponds to the service application, sends a card application selection request (5), and control section 32 returns a response to RW 10 (6) after starting the authentication application stored in access control secure module 34. The authentication application that has started refers to the access control information and executes mutual authentication processing with RW 10 using the RW authentication information which is specified for the corresponding service application (7). When the authentication processing succeeds, RW 10 specifies AID of service application 23 and requests a card application selection (8). The authentication processing has succeeded, so that control section 32 of secure module holder 30 transmits this card application selection request to secure module 20 in which specified service application 23 is stored. In this way, when data received from SH local wireless communication section 31 is sent to secure module 20 through SH communication section 33, control section 32 of secure module holder 30 converts the data format of the data from a non-contact communication data format (ISO14443-3 Block Format) to a contact communication data format (ISO7816-3-3 Block Format) Conversely, control section 32 performs reverse data format conversion for data to be sent from secure module 20 to RW 10.

Control section 22 of secure module 20 which has received the card application selection request for service application 23 starts specified service application 23 and then returns a response to RW 10 (9)

Next, processing of executing a service is performed between service execution section 12 of RW 10 and specified service application 23 (10).

Here, description has been given assuming that AID of an authentication card application which corresponds to a service application differs from one application to another, but when identical RW authentication information and authentication method are used to all service applications, AID of an authentication card application may be common to all service applications.

Furthermore, when secure module 20 is removed from secure module holder 30, the local wireless communication function of secure module 20 is enabled.

In this way, this scheme differentiates AID of a service application from AID of an authentication application and when a service application selection request is received from RW 10, the service application selection request from RW 10 is not responded until authentication processing succeeds.

Furthermore, a communication between RW 10 and secure module 20 after the authentication processing succeeds is executed through secure module holder 30.

The program of secure module holder 30 prescribes that control section 32 should execute a step of disabling the non-contact communication section of secure module 20, a step of causing the authentication application to perform authentication processing with RW 10 and a step of permitting RW 10 to access service application 23 only when this authentication processing succeeds.

As a feature of this scheme, secure module holder 30 rewrites a command, and therefore the workload imposed on secure module holder 30 is large. However, there is a merit in that it is clear and easily understandable to RW 10 up to what part the RW authentication processing and service processing have been completed.

When a battery is mounted in secure module 20, secure module holder 30 may start charging the battery in accordance with timing at which the local communication function is disabled.

Embodiment 2

In Embodiment 2 of the present invention, a scheme will be described whereby a communication between an RW and a secure module after authentication processing has succeeded is carried out through a non-contact communication section of the secure module.

The configurations of the secure module holder and RW in this case are identical to those in Embodiment 1 (FIG. 3). Furthermore, this embodiment is also the same as Embodiment 1 in that access of RW 10 to service application 23 is permitted only when authentication with an authentication application stored in access control secure module 34 succeeds. However, unlike Embodiment 1, when RW 10 succeeds in authentication with an authentication application, SM local wireless communication section 21 of secure module 20 is enabled and a communication between secure module 20 and RW 10 is performed through a non-contact communication between SM local wireless communication section 21 and RW local wireless communication section 11.

Figure 5:
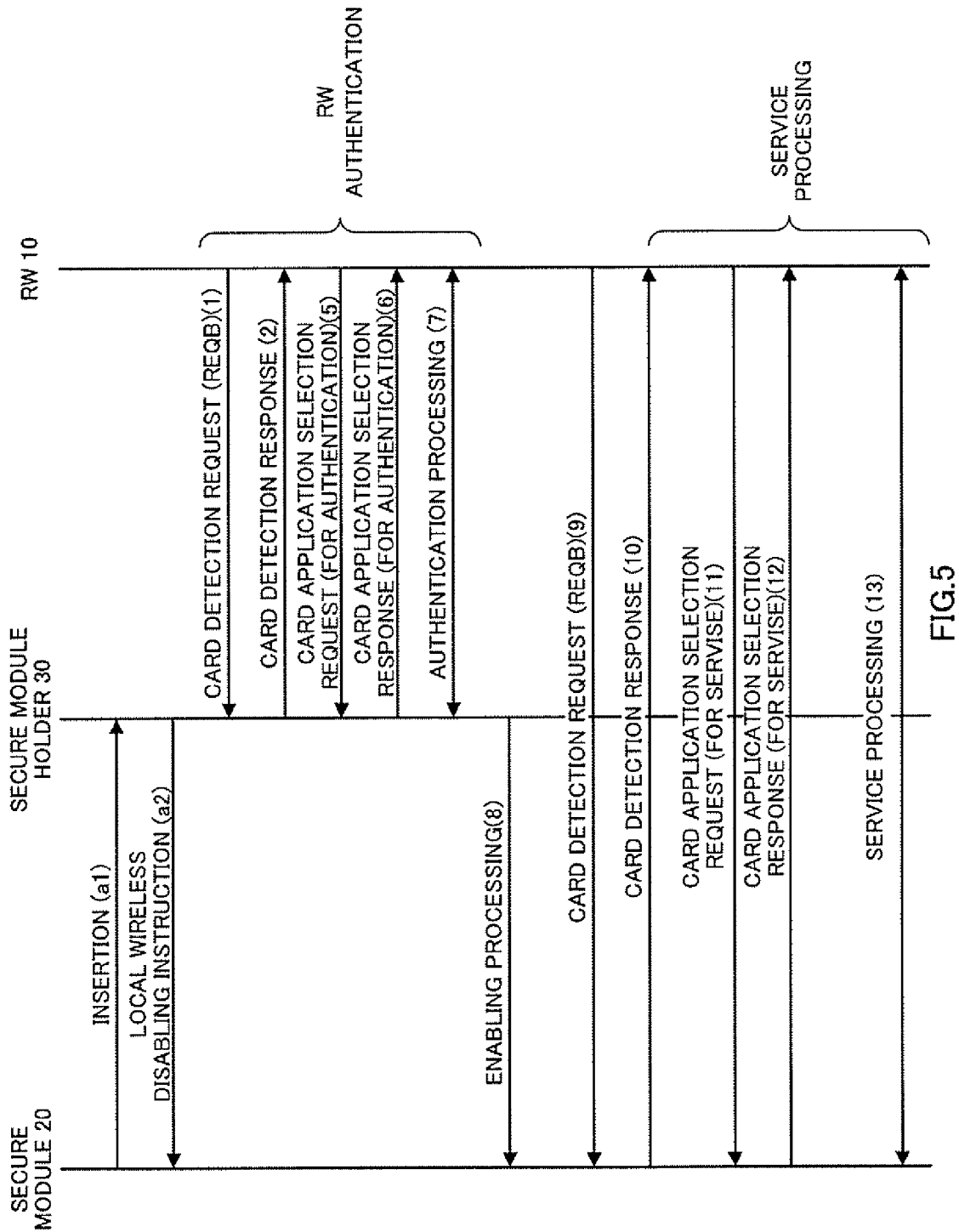
FIG. 5 is a flow chart showing RW access limitation steps to a secure module of a secure module holder according to Embodiment 2 of the present invention.

FIG. 5 shows processing steps in this case Here, a case will be described where AID of service application 23 and AID of an authentication card application which performs authentication processing for the service application are different.

Steps (a1) and (a2) in which the local communication function of secure module 20 inserted in secure module holder 30 is disabled and steps (1), (2), (5), (6) and (7) until RW 10 performs authentication processing with the authentication application stored in access control secure module 34 are the same as those in Embodiment 1 (FIG. 4).

Upon succeeding in the authentication processing, control section 32 of secure module holder 30 enables the local communication function of secure module 20 in which service application 23 corresponding to the authentication application is stored (8).

At this time, a reporting section provided for above described secure module holder 30 may report the user that the local communication function has been enabled.

RW 10 transmits a request command (REQB) again (9) and secure module 20 replies through SM local wireless communication section 21 (10). RW 10 specifies AID of service application 23 and sends a card application selection request (11). Control section 22 of secure module 20 which has received this card application selection request through SM local wireless communication section 21 starts specified service application 23 and then returns a response to RW 10 through SM local wireless communication section 21 (12).

Next, the processing of executing a service is performed between service execution section 12 of RW 10 and specified service application 23 through RW local wireless communication section 11 and SM local wireless communication section 21 (13).

When non-contact communication is not carried out for a predetermined time or more by secure module 20 whose local communication function is enabled, control section 32 of secure module holder 30 disables the local communication function again (time-out).

As another method of re-disabling, it is also possible to disable the local communication function when control section 32 receives a processing completion report from service application 23.

Furthermore, it is possible to disable the local communication function when secure module holder 30 periodically performs polling on secure module 20 and control section 32 detects that the processing of service application 23 has been completed.

Moreover, the reporting section provided for above described secure module holder 30 may also report the disabling to the user.

In this way, this scheme differentiates AID of a service application from AID of an authentication application and when an authentication application selection request is received from RW 10, the service application selection request from RW 10 cannot be made until authentication processing succeeds.

Furthermore, a communication between RW 10 and service application 23 after the authentication processing succeeds is performed using the local communication function of secure module 20.

The program of secure module holder 30 prescribes that control section 32 should execute a step of disabling the non-contact communication section of secure module 20, a step of causing the authentication application to perform authentication processing with RW 10 and a step of enabling the non-contact communication section of secure module 20 only when this authentication processing succeeds.

As a feature of this scheme, secure module holder 30 need not rewrite a command so that the workload imposed on secure module holder 30 is small. Further, there is a merit that it is clear and easily understandable to RW 10 up to what part the RW authentication and service processing have been completed. On the other hand, RW 10 must request card detection twice.

However, when control section 32 of secure module holder 30 enables the local communication function of secure module 20 (8), it is possible to omit the steps of requesting second card detections (9) and (10) by sending the results of the card detection processing (1) and (2) executed between secure module holder 30 and RW 10 to secure module 20 and transmitting CID assigned by RW 10 to secure module 20.

Embodiment 3

In Embodiment 3 of the present invention, a case will be described where AID of a service application is set to be identical to AID of an authentication application which performs authentication processing for the service application. Here, a case will be described where a communication between an RW and a secure module after the authentication processing succeeds is carried out through a secure module holder.

The configurations of this secure module holder and RW are identical to those in Embodiment 1 (FIG. 3).

Figure 6:
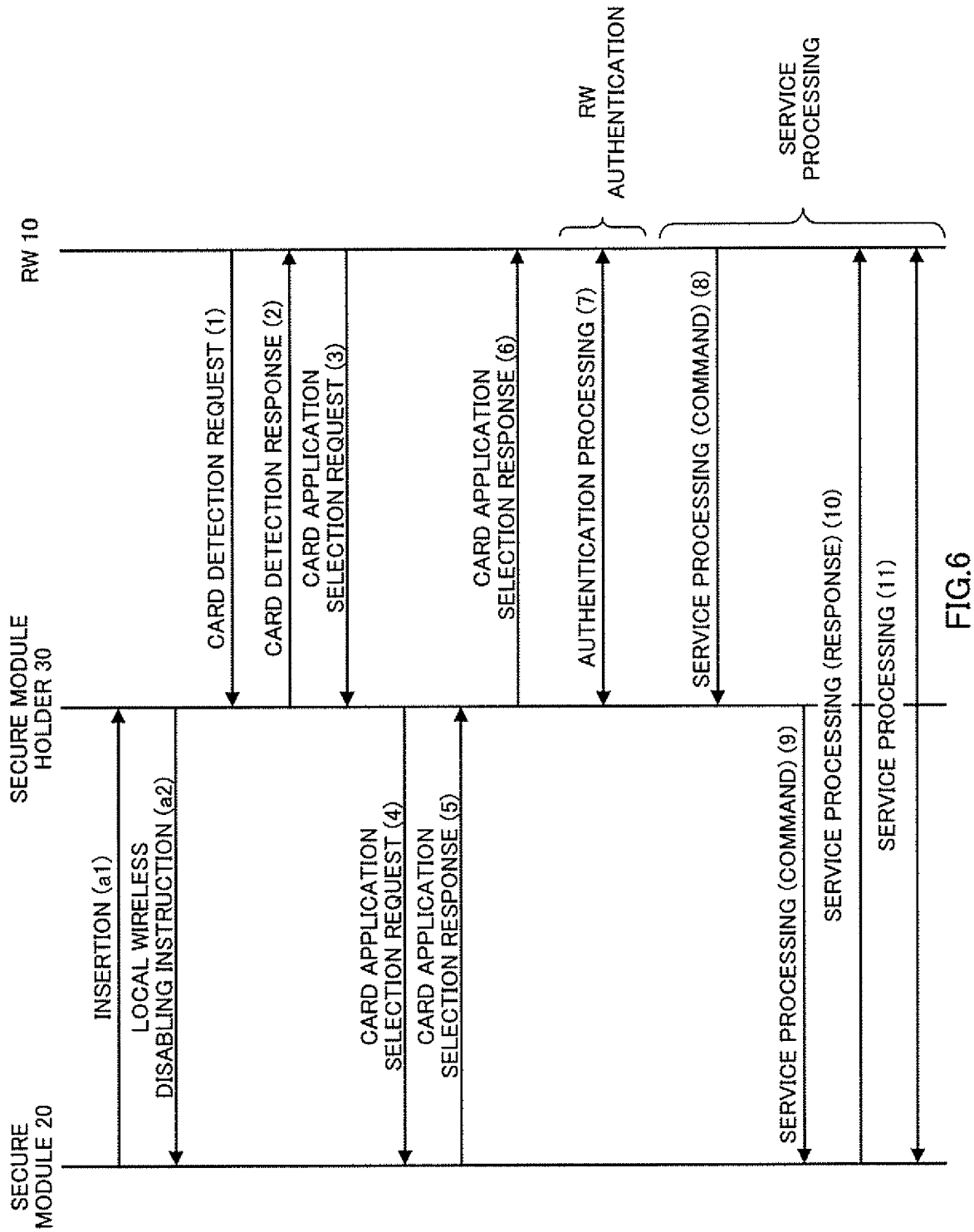
FIG. 6 is a flow chart showing RW access limitation steps to a secure module of a secure module holder according to Embodiment 3 of the present invention.

FIG. 6 shows processing steps in this case.

Steps (a1) and (a2) of disabling the local communication function of secure module 20 inserted in secure module holder 30, and steps (1) and (2) until control section 32 of secure module holder 30 responds to a card detection request of RW 10 are the same as those of Embodiment 1 (FIG. 4).

When RW 10 specifies AID of a service application and requests a selection of a card application (3), control section 32 of secure module holder 30 transmits the card application selection request to secure module 20 which stores the specified service application (4). In the case where RW 10 transmits received data to secure module 20 or secure module 20 transmits received data to RW 10, this embodiment is the same as Embodiment 1 in that control section 32 of secure module holder 30 converts the data format.

Control section 22 of secure module 20 which has received a card application selection request starts specified service application 23 and then returns a response to control section 32 of secure module holder 30 (5). Control section 32 of secure module holder 30 saves this response, starts the authentication application of AID specified by RW 10 from access control secure module 34 (or starts a dummy authentication application when there is no corresponding authentication application) and returns a response to RW 10 (6).

The started authentication application performs authentication processing with RW 10 using the RW authentication information of the access control information (7). It should be noted that when the dummy authentication application carries out authentication processing, the authentication fails and the processing stops at that point.

When the authentication with RW 10 succeeds, a service processing command is transmitted from RW 10 (8). Control section 32 of secure module holder 30 transmits this command (9) to secure module 20 which replied at (5). Started service application 23 responds to this command (10), service execution section 12 of RW 10 and specified service application 23 communicate with each other through secure module holder 30 and carry out processing of executing a service (11).

Even if there is a response from secure module 20 when a card application selection is requested, control section 32 of this secure module holder 30 does not relay the communication between RW 10 and secure module 20 until the authentication of RW 10 is completed. Furthermore, even when the card application whose selection is requested does not exist in any secure module 20, control section 32 behaves such that the fact is not known to RW 10 which has not been authenticated yet.

Steps (4) and (5) of transmitting the card application selection request to secure module 20 may also be performed after the authentication processing succeeds (7) and a service processing command is received from RW 10 (8).

In this way, according to this scheme, AID of a service application is set to be identical to AID of an authentication application, the authentication application of the identical AID is started when a selection of a service application is requested from RW 10 and a communication between service application 23 and RW 10 cannot be performed until the authentication processing succeeds.

Furthermore, a communication between RW 10 and secure module 20 after the authentication processing succeeds is carried out through secure module holder 30.

The program of secure module holder 30 prescribes that control section 32 should execute a step of disabling the non-contact communication section of secure module 20, a step of starting an authentication application of the identical AID in response to a card application selection request of RW 10 and causing it to perform authentication processing with RW 10 and a step of supporting a communication between RW 10 and service application 23 only when this authentication processing succeeds.

As a feature of this scheme, the workload on secure module holder 30 of rewriting a command is large. However, there is an advantage that RW 10 need not be aware of secure module holder 30 and secure module 20, and RW 10 can be used without changing the program of conventional RW 10.

Embodiment 4

In Embodiment 4 of the present invention, a case will be described where AID of a service application is set to be identical to AID of an authentication card application which performs authentication processing for the service application and a communication between an RW and a secure module after the authentication processing succeeds is carried out through a non-contact communication section of the secure module.

The configurations of this secure module holder and RW are identical to those in Embodiment 1 (FIG. 3).

Figure 7:
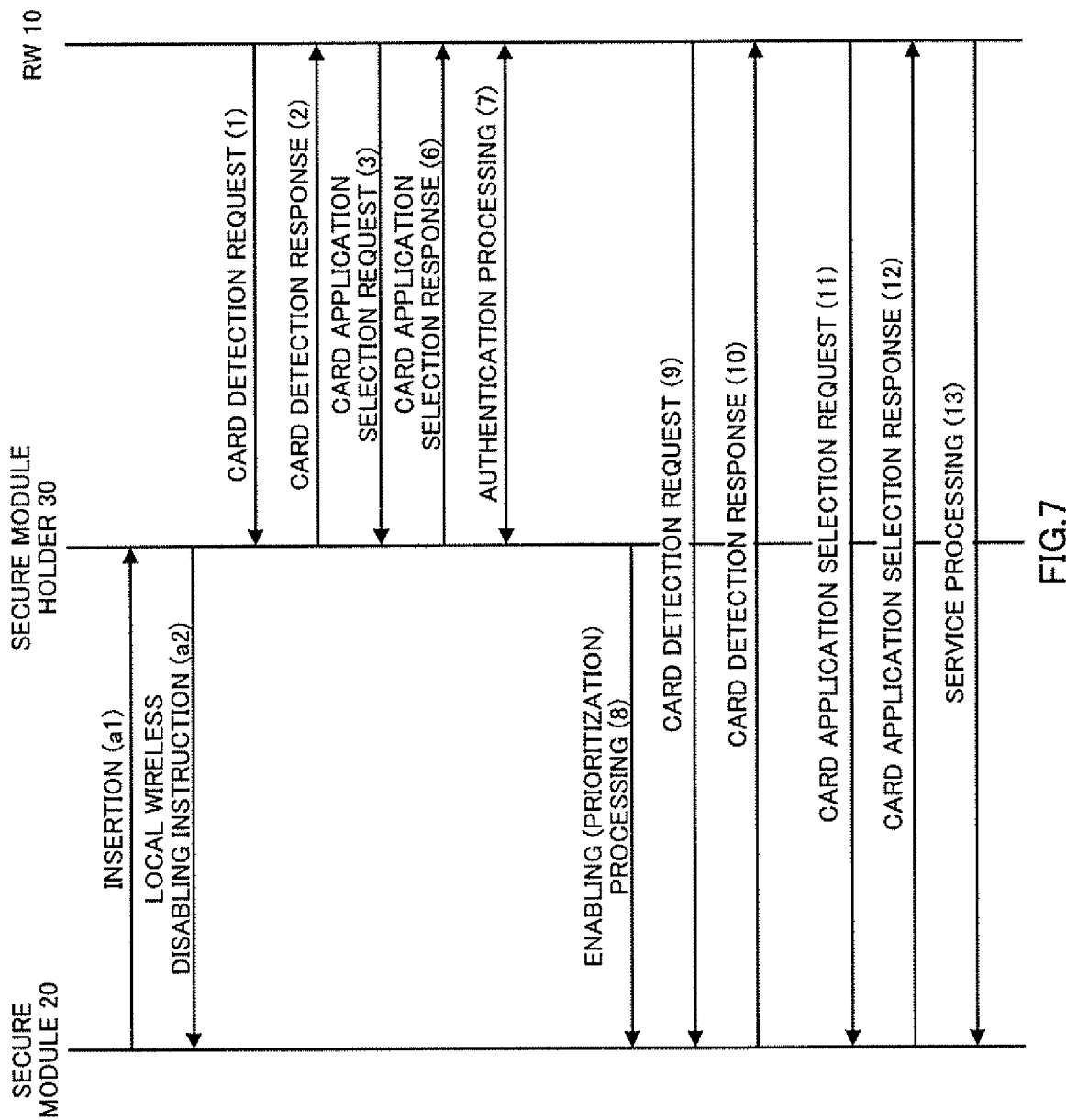
FIG. 7 is a flow chart showing RW access limitation steps to a secure module of a secure module holder according to Embodiment 4 of the present invention.

FIG. 7 shows processing steps in this case.

Steps (a1) and (a2) of disabling the local communication function of secure module 20 inserted in secure module holder 30 and steps (1), (2), (3), (6) and (7) from a card detection request of RW 10 until authentication processing is carried out are identical to those in Embodiment 3 (FIG. 6).

Upon succeeding in the authentication processing, control section 32 of secure module holder 30 enables (gives priority to) the local communication function of secure module 20 in which service application 23 of AID identical to that of the authentication application is stored (8).

RW 10 transmits a request command (REQB) again (9) and secure module 20 replies through SM local wireless communication section 21 (10). RW 10 specifies AID of service application 23 and requests a card application selection (11). Control section 22 of secure module 20 which has received this card application selection request through SM local wireless communication section 21 starts specified service application 23 and then returns a response to RW 10 through SM local wireless communication section 21 (12).

Next, the processing of executing a service through RW local wireless communication section 11 and SM local wireless communication section 21 is carried out between service execution section 12 of RW 10 and specified service application 23 (13).

In this way, according to this scheme, AID of a service application is set to be identical to AID of an authentication application, and the authentication application of the identical AID is started when a service application selection is requested from RW 10, but communication between service application 23 and RW 10 cannot be carried out until authentication processing succeeds.

Furthermore, a communication between RW 10 and secure module 20 after the authentication processing succeeds is carried out through the non-contact communication section of secure module 20.

The program of secure module holder 30 prescribes that control section 32 should execute a step of disabling the non-contact communication section of secure module 20, a step of starting an authentication application of the identical AID in response to a card application selection request of RW 10 and causing it to perform authentication processing with RW 10 and a step of enabling the non-contact communication section of secure module 20 only when this authentication processing succeeds.

As a feature of this scheme, secure module holder 30 need not rewrite a command, so that the workload imposed on secure module holder 30 is small. Furthermore, conventional secure module 20 inserted in secure module holder 30 can be used as it is. On the other hand, however, RW 10 needs to request card detection twice.

Embodiment 5

As with Embodiment 4, in Embodiment 5 of the present invention, a case will be described where AID of a service application is set to be identical to AID of an authentication card application which performs authentication processing for the service application and a communication between an RW and a secure module after the authentication processing succeeds is carried out through the non-contact communication section of the secure module and a conventional RW can be used for the RW as it is.

The configurations of this secure module holder and RW are the same as those of Embodiment 1 (FIG. 3).

Figure 8:
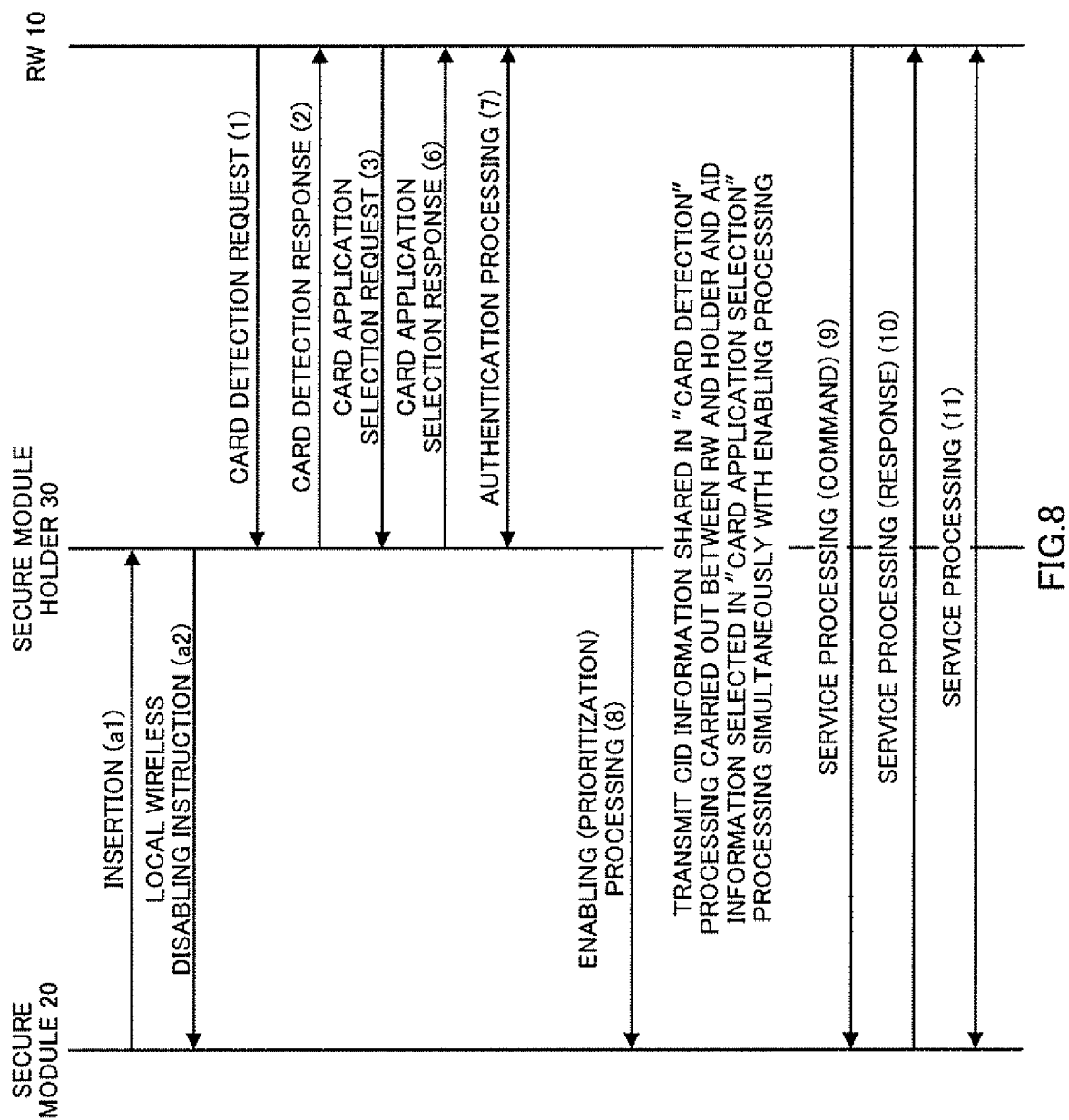
FIG. 8 is a flow chart showing RW access limitation steps to a secure module of a secure module holder according to Embodiment 5 of the present invention.

FIG. 8 shows processing steps in this case.

Steps (a1) and (a2) of disabling the local communication function of secure module 20 inserted in secure module holder 30 and steps (1), (2), (3), (6) and (7) from a card detection request of RW 10 until authentication processing is carried out are identical to those in Embodiment 3 (FIG. 6).

Upon succeeding in the authentication processing, control section 32 of secure module holder 30 transmits an instruction for enabling the local communication function to secure module 20 in which service application 23 with AID identical to that of the authentication application is stored (8). At this time, control section 32 of secure module holder 30 transmits CID information acquired in the "card detection" processing (1) and (2) with RW 10 and the AID information specified in the "card application selection" processing (3) and (6) to secure module 20 concurrently with the enabling processing.

Control section 22 of secure module 20 which has received this enabling processing instruction enables SM local wireless communication section 21, starts service application 23 of the specified AID and moves to a mode of responding to a case where a service command including the specified CID information in the header is received.

When a service processing command is transmitted from RW 10 (9), control section 22 of secure module 20 receives this at SM local wireless communication section 21, sends it to service application 23 which has already been started and service application 23 replies to this command (10), and service execution section 12 of RW 10 and specified service application 23 perform processing of executing a service (11).

In this case, the program of secure module holder 30 prescribes that control section 32 should execute a step of disabling the non-contact communication section of secure module 20, a step of starting an authentication application of the identical AID in response to a card application selection request of RW 10 and causing it to perform authentication processing with RW 10 and a step of enabling the non-contact communication section of secure module 20 only when this authentication processing succeeds and providing the information on CID and AID acquired from RW 10 to secure module 20.

This scheme takes an advantage that the conventional program used in RW 10 need not be changed.

Embodiment 6

In Embodiment 6 of the present invention, a method will be described where authentication information used for authentication of an RW or the like is set in an access control secure module of a secure module holder.

In the case of a well-known service that has been widely spreading, authentication information used for authentication of RW (authentication information with which RW could be authenticated and a response may be returned to that RW if corresponding AID is found) is preset in an access control secure module of a secure module holder.

However, in the case of a service where authentication information is not set in the access control secure module, it is necessary to set the authentication information in the access control secure module. For that reason, the processing of inserting a secure module in which the service application and the authentication information are stored in the secure module holder and writing the authentication information stored in this secure module into the access control secure module is performed.

In this case, it is also possible to consider registering a mode about each piece of authentication information (e.g., for normal business day and for holiday) so that the user switches between modes when used. Furthermore, when a calendar function is provided inside secure module holder 30, it is possible to automatically switch over to, for example, a normal business day mode or night/holiday mode.

Figure 9:
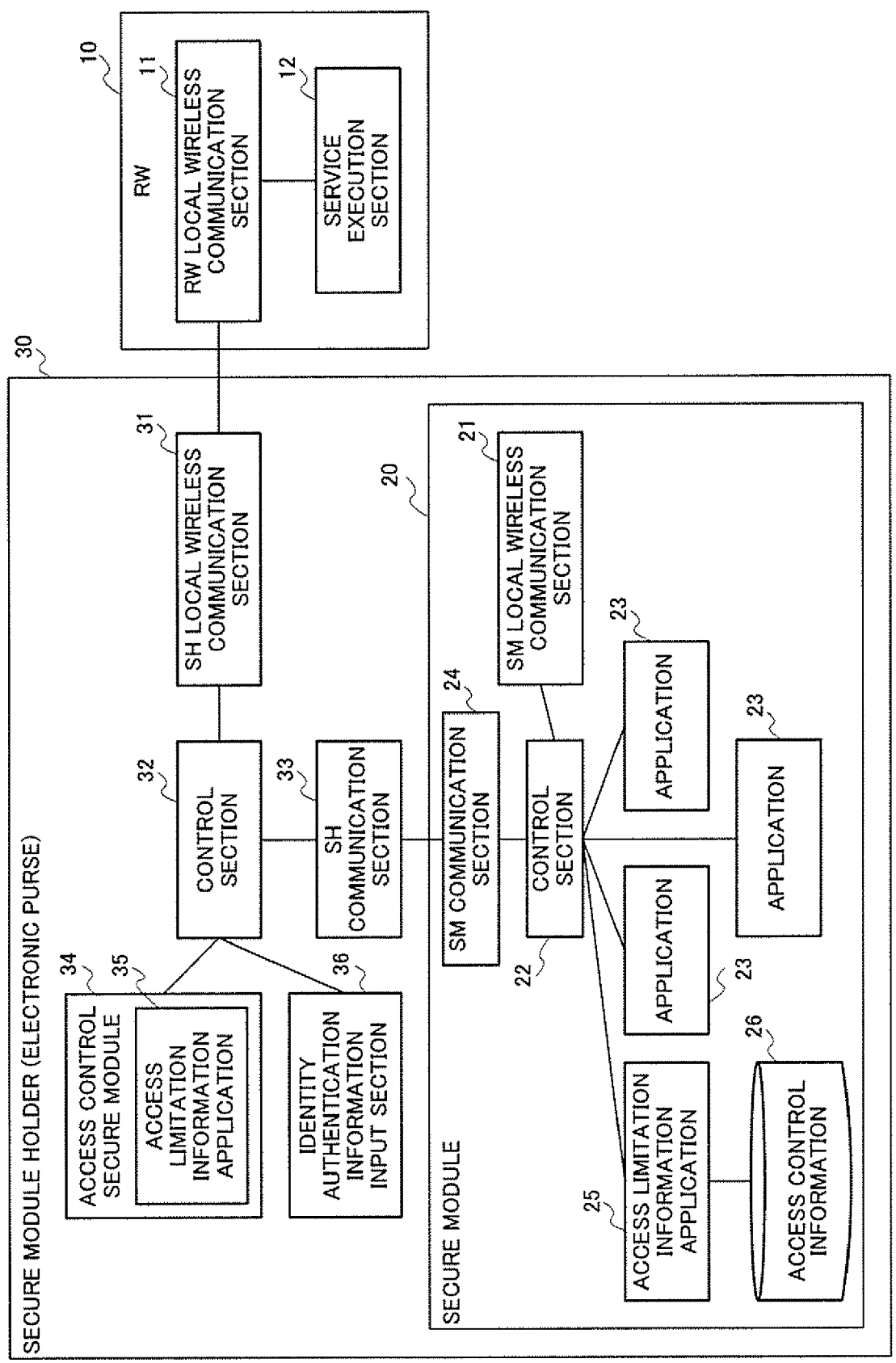
FIG. 9 is a block diagram showing a configuration of a secure module holder and secure module according to Embodiment 6 of the present invention.

FIG. 9 shows the configuration of secure module holder 30 and secure module 20 that perform this processing. In addition to SM local wireless communication section 21, a plurality of card applications (service applications) 23, SM communication section 24 and control section 22, secure module 20 is also provided with access control information 26 that prescribes RW authentication information and the authentication method carried out using this RW authentication information on each card application 23 as shown in FIG. 10 and access limitation information application 25 that carries out processing of writing this access control information 26 into secure module holder 30.

Access control secure module 34 may be directly built in secure module holder 30 or may be stored as a physically removable module (a different secure module from secure module 20 in FIG. 9 is assumed) insecure module holder 30.

Furthermore, it is also possible to perform access control over a card application mounted in secure module 20 and stored in another secure modules.

Furthermore, identity authentication information input section 36 and access control secure module 34 may also be mounted on a physically identical module and made removal. In this case, the user can select preferred identity authentication information input means (PIN, iris, dactylogram or the like) and attach it to secure module holder 30.

Furthermore, in addition to SH local wireless communication section 31, SH communication section 33 and control section 32, secure module holder 30 is also provided with access control secure module 34 that holds access limitation information application 35 carrying out processing during writing of access control information 26 and identity authentication information input section 36 to which information to authenticate the identity of the user is input.

Figure 11:
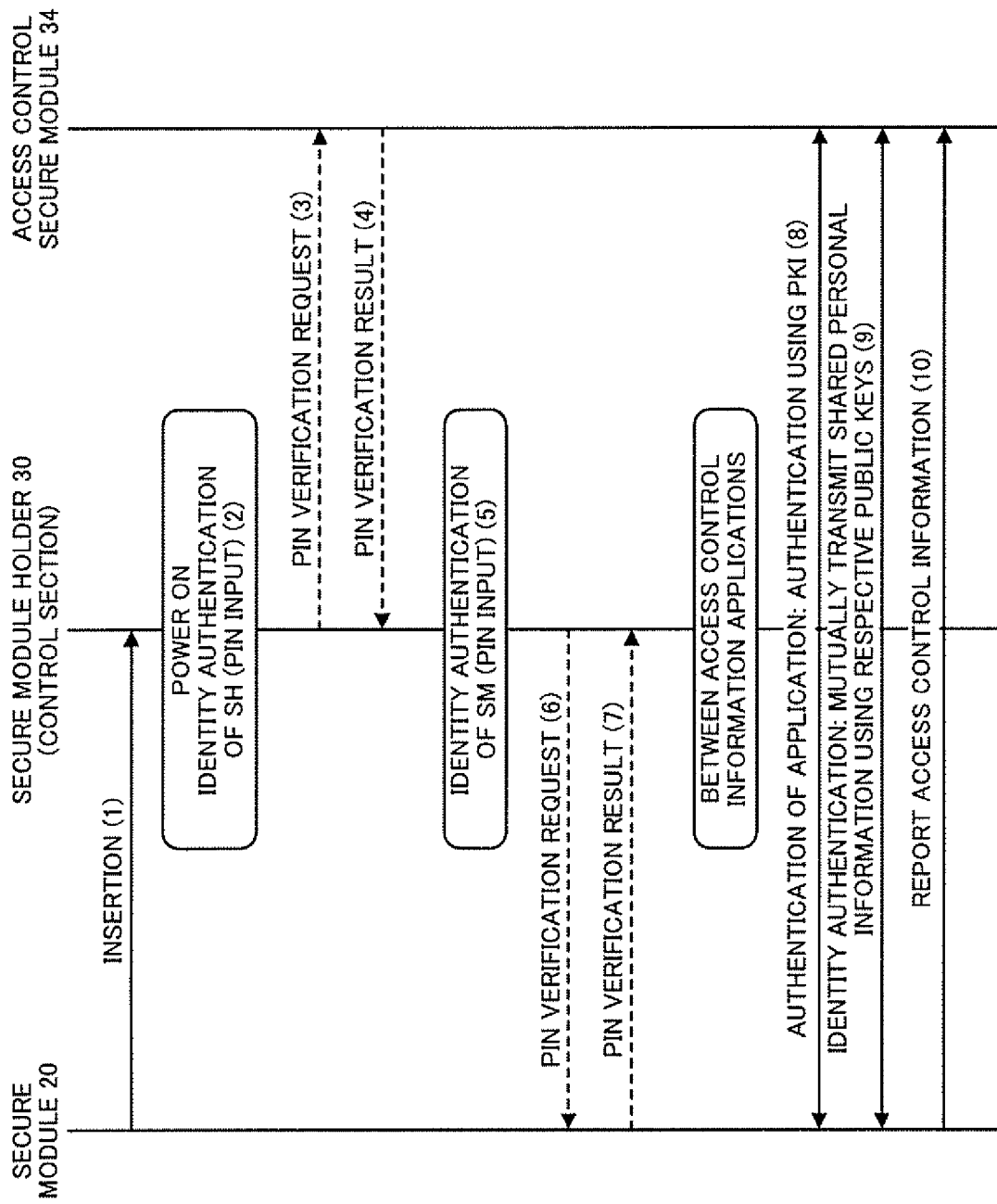
FIG. 11 is a flow chart showing access control information setting steps according to Embodiment 6 of the present invention.

FIG. 11 shows steps in which when secure module 20 is inserted in secure module holder 30, access control information 26 stored in secure module 20 is written into access control secure module 34 of secure module holder 30.

When secure module 20 is inserted in secure module holder 30 (1), control section 32 turns on power of secure module holder 30 and demands a PIN input for identity authentication at secure module holder 30. When the user inputs a PIN from identity authentication information input section 36 (2), control section 32 requires access limitation information application 35 of access control secure module 34 to verify the PIN (3). Access limitation information application 35 compares the input PIN with the PIN registered in advance in access control secure module 34 and informs the verification result of the PIN to control section 32 (4). Upon succeeding in this verification, control section 32 demands a PIN input of secure module 20 for identity authentication. When the user inputs the PIN from identity authentication information input section 36 (5), control section 32 requires access limitation information application 25 of secure module 20 to verify the PIN (6). Access limitation information application 25 compares the input PIN with the PIN registered in advance in secure module 20 and informs the verification result of the PIN to control section 32 (7). Upon also succeeding in this verification, control section 32 mediates the communication between access limitation information application 25 of secure module 20 and access limitation information application 35 of access control secure module 34. Both access limitation information applications 35 and 25 authenticate each other using PKI (public key infrastructure) (8), exchange the PIN information (or personal information on registered dactylogram or the like) used for the verification using their respective public keys and confirm that the person whom secure module holder 30 verified is identical to the person whom secure module 20 verified (9). Next, access limitation information application 25 of secure module 20 reports access control information 26 to access limitation information application 35 of access control secure module 34 (10) and access limitation information application 35 stores this access control information 26 in access control secure module 34.

Figure 12:
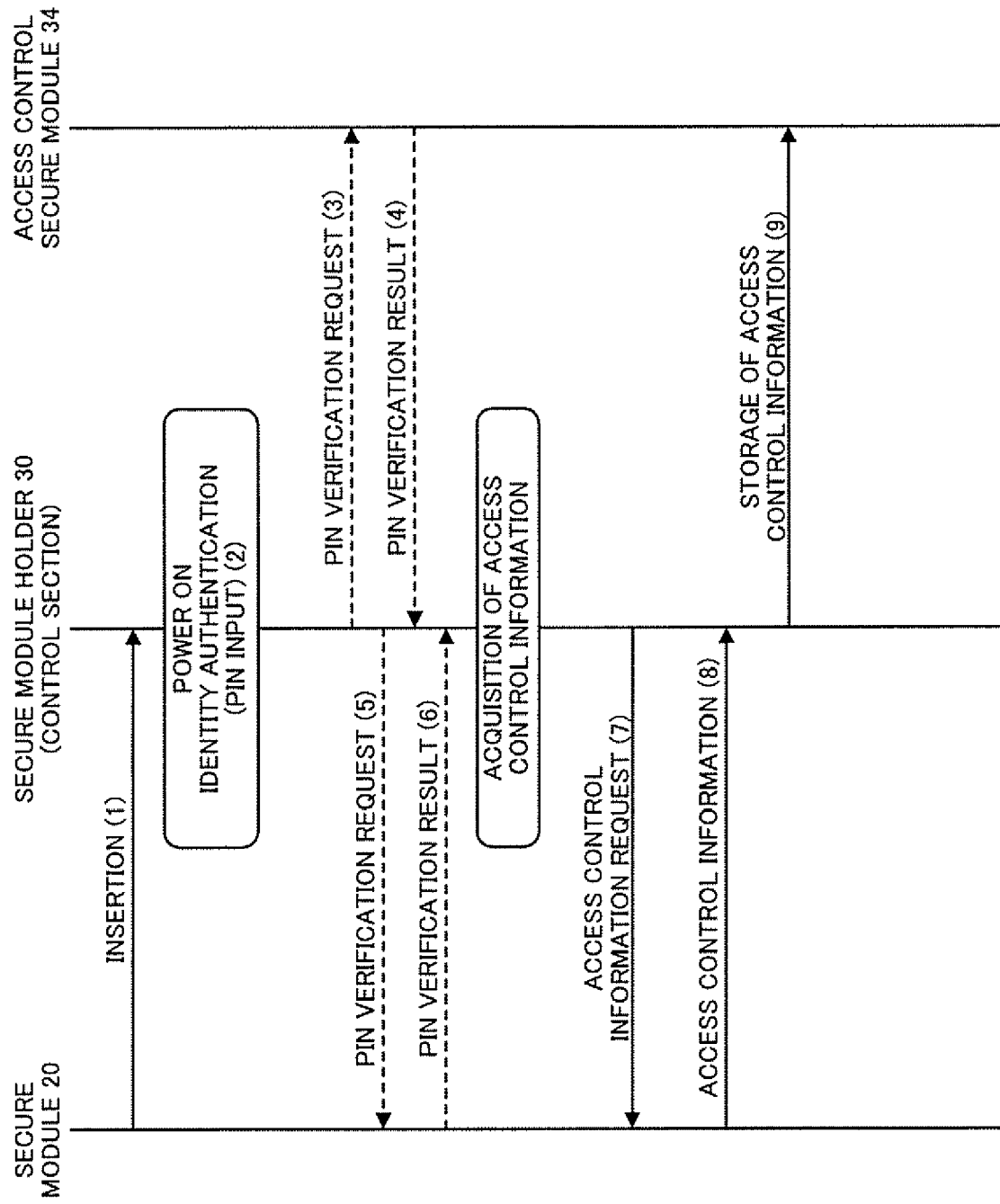
FIG. 12 is a flow chart showing second access control information setting steps according to Embodiment 6 of the present invention.

Furthermore, FIG. 12 shows steps for simply writing access control information 26 stored in secure module 20 into access control secure module 34 of secure module holder 30.

When secure module 20 is inserted in secure module holder 30 (1), control section 32 turns on power of secure module holder 30 and demands a PIN input for identity authentication. When the user inputs a PIN from identity authentication information input section 36 (2), control section 32 requires access limitation information application 35 of access control secure module 34 to verify the PIN (3) and also requires access limitation information application 25 of secure module 20 to verify the input PIN (5). Control section 32 obtains the verification result from access limitation information application 35 and access limitation information application 25 (4) and (6), and when both verifications succeed, control section 32 requests access limitation information application 25 of secure module 20 for access control information 26 (7), obtains access control information from access limitation information application 25 (8) and stores this in access control secure module 34 (9).

For identity authentication, living body information such as dactylogram and palm pattern or the like may also be input.

In this way, by performing mutual identity authentication at both secure module holder 30 and secure module 20, it is possible to prevent acts like inserting own secure module 20 in secure module holder 30 of a stranger and using it or inserting secure module 20 of a stranger in own secure module holder 30 and using it.

Figure 13:
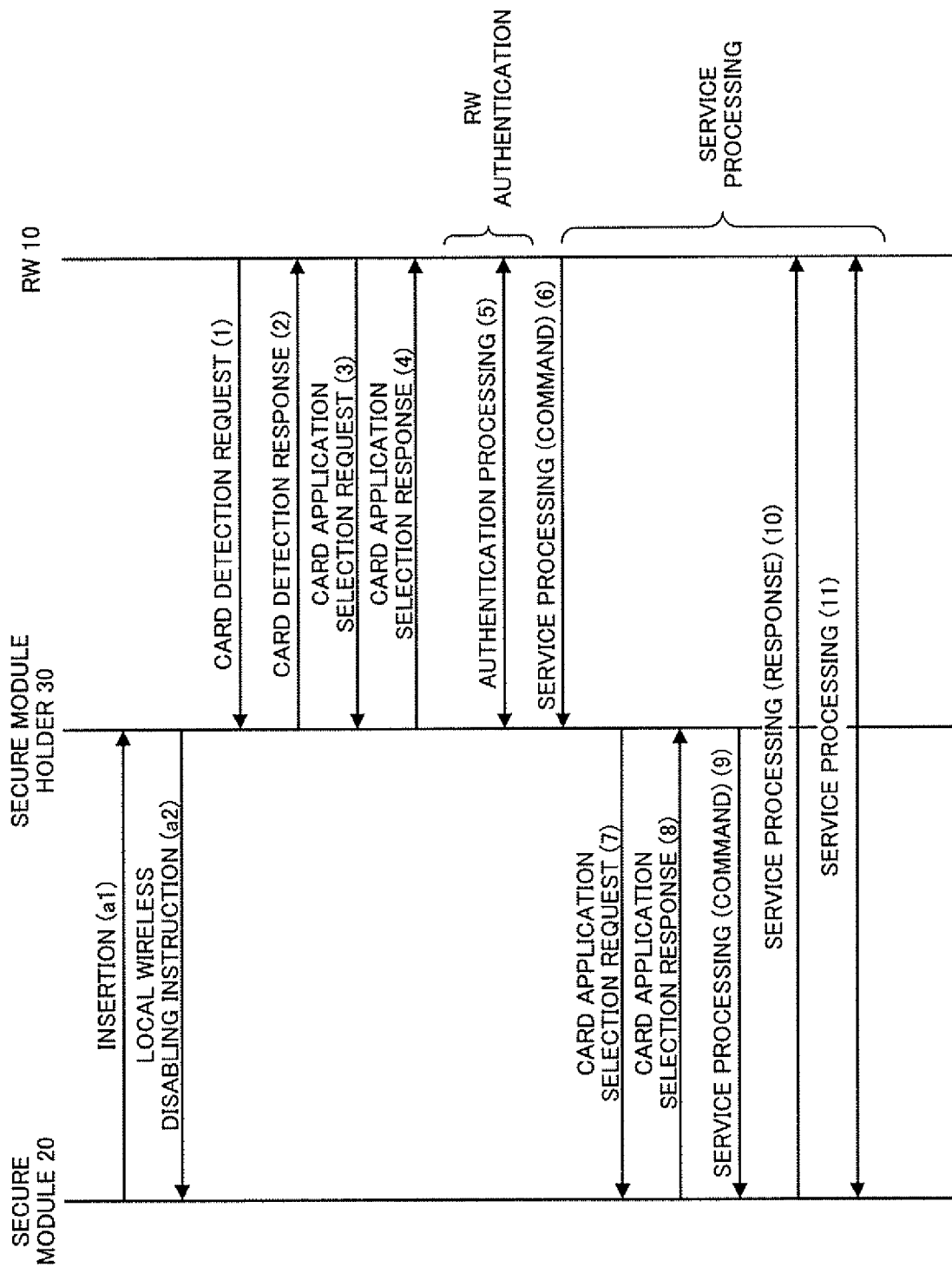
FIG. 13 is a flow chart showing steps of imposing RW access limitation on the secure module of the secure module holder using the access control information according to Embodiment 6 of the present invention.

FIG. 13 shows, when access control information 26 of card application (service application) 23 of secure module 20 is written in access control secure module 34 of secure module holder 30, an example of processing steps when holding up secure module holder 30 in which this secure module 20 is inserted over the RW and using the service of service application 23.

As with Embodiment 3 (FIG. 6), this procedure is an example of a pattern that AID of a service application is set to be identical to AID of an authentication application and a communication between RW 10 and secure module 20 is carried out through secure module holder 30.

The local communication function of secure module 20 inserted in secure module holder 30 is disabled (a1) and (a2). Control section 32 of secure module holder 30 replies to a card detection request of RW 10 (1) and (2) and when RW 10 specifies AID of the service application and requests a card application selection (3), control section 32 starts an authentication application with the AID and then returns a response to RW 10 (4). The authentication application refers to the access control information stored in access control secure module 34 and authenticates the RW using the RW authentication information specified in correspondence with the AID according to the specified authentication method (5).

Upon succeeding in this authentication, a service processing command is transmitted from RW 10 (8). Control section 32 of secure module holder 30 transmits the card application selection request to secure module 20 in which the service application with the specified AID is stored (7). After starting service application 23, control section 22 of secure module 20 returns a response to control section 32 of secure module holder 30 (8). Control section 32 of secure module holder 30 transmits the service processing command (9) to secure module 20 which replied at (8). Service application 23 which has already been started replies to this command (10) and service execution section 12 of RW 10 and specified service application 23 communicate with each other through secure module holder 30 and perform processing of executing a service (11).

In this way, if access control information 26 together with card application 23 is stored in secure module 20, access control information 26 is written into secure module holder 30 when this secure module 20 is inserted in secure module holder 30, so that secure module 20 can be used while being inserted in secure module holder 30.

Therefore, for example, even at a small-scale store, by storing card application 23 which provides a service with a RW installed at the store and access control information 26 thereof in secure module 20 it is possible to easily issue secure module 20 available at secure module holder 30.

Embodiment 7

Embodiment 7 of the present invention will describe a method of preventing information of a card application stored in a card-shaped secure module to be used as a single unit from being known to an RW which has not been authenticated yet.

Figure 14:
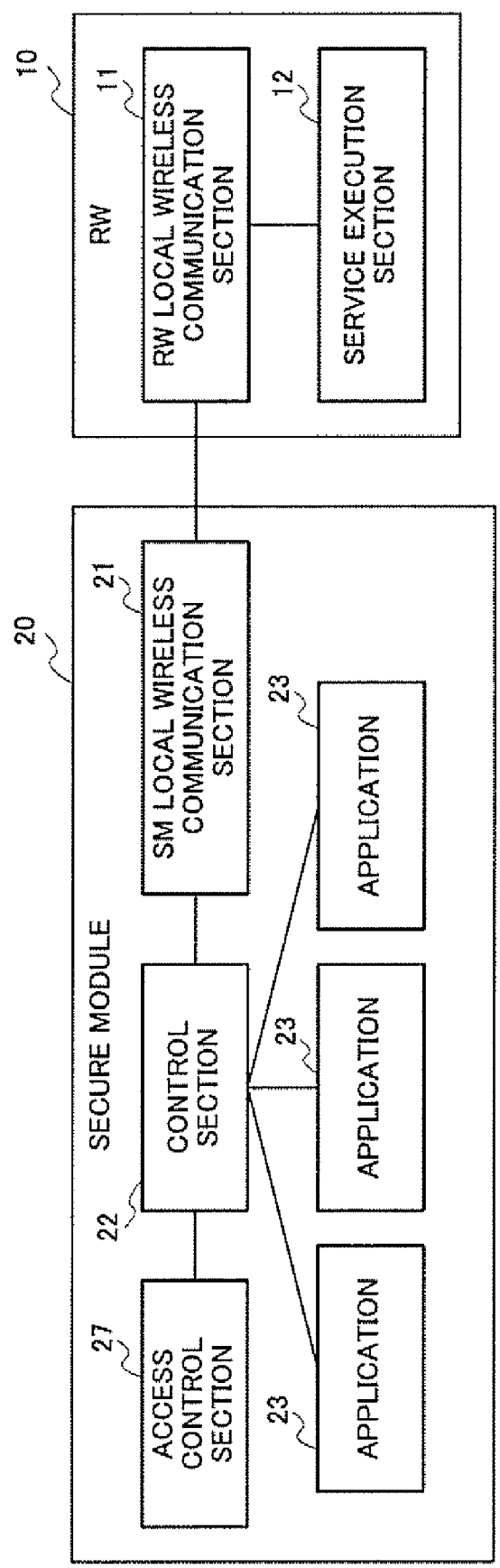
FIG. 14 is a block diagram showing a configuration of a secure module according to Embodiment 7 of the present invention.

FIG. 14 shows a configuration of secure module 20 that implements this method.

This secure module 20 is provided with SM local wireless communication section 21 which is a non-contact communication section, a plurality of card applications (service applications) 23, access control section 27 that authenticates RW 10 that accesses card application 23 and control section 22 that controls the operation of secure module 20. Control section 22 is composed of a CPU, and the operation thereof is prescribed by a program.

Access control section 27 has an application similar to the authentication application which is stored in access control secure module 34 of secure module holder 30 shown in FIG. 3 and also has access control information about each card application 23 as shown in FIG. 10. When authenticating RW 10, the authentication application with refers to this access control information and performs authentication processing using RW authentication information corresponding to card application 23 according to a specified authentication method.

AID of this authentication application may also be set apart from the card application as in Embodiments 1 and 2 or may also be set to be identical to that of the card application as in Embodiments 3 and 4.

Figure 15:
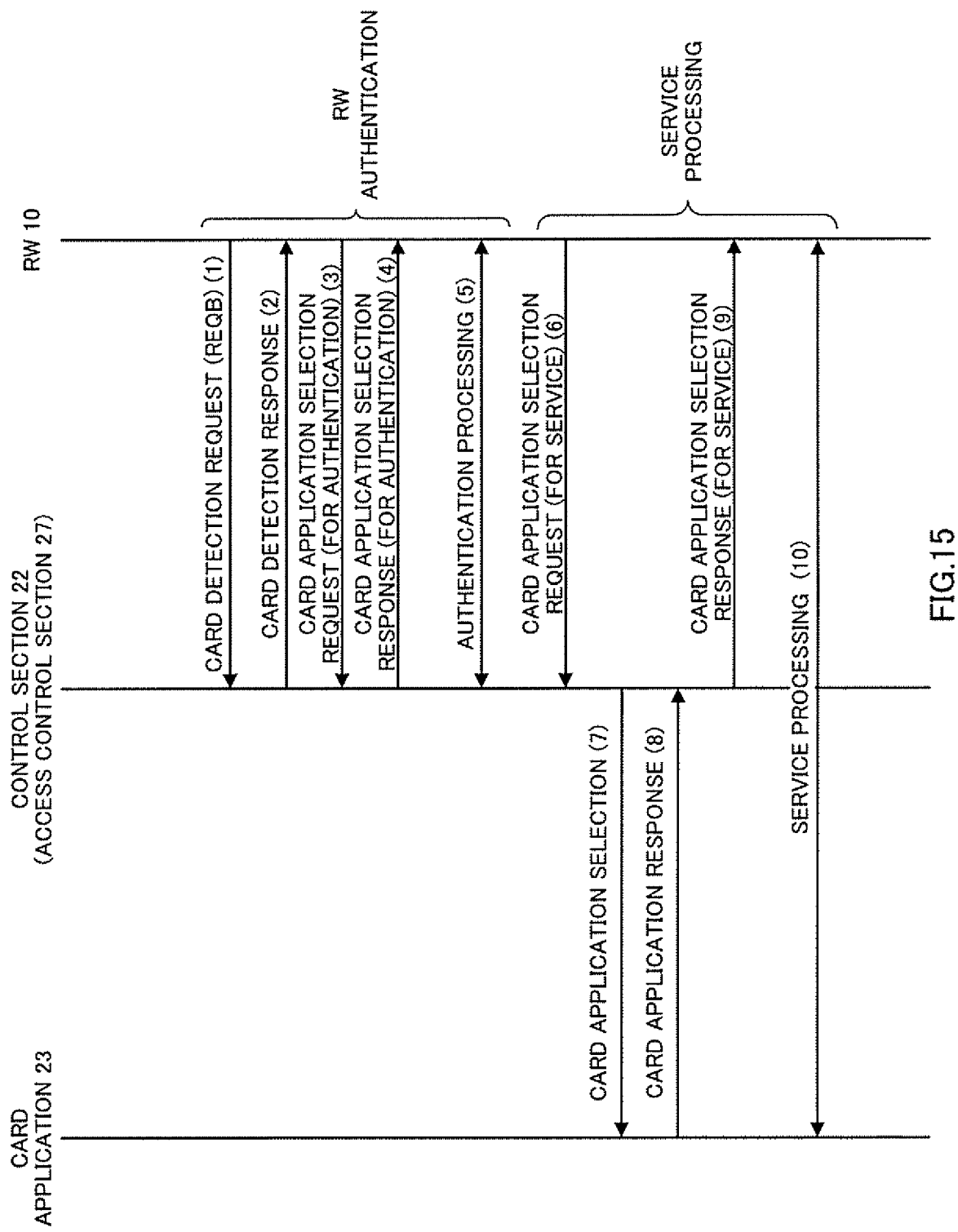
FIG. 15 is a flow chart showing steps of imposing RW access limitation on a secure module according to Embodiment 7 of the present invention.

FIG. 15 shows processing steps when AID of the authentication application is different from AID of the card application.

RW 10 periodically transmits a request command (REQB) to detect approaching of the secure module to the communication area (1). When the user holds up secure module 20 over RW 10 and SM local wireless communication section 21 receives REQB, control section 22 replies through SM local wireless communication section 21 in accordance with an anticollision procedure (2).

RW 10 specifies AID of the authentication application corresponding to the service application, sends a card application selection request (3), and control section 22 starts a specified authentication application stored in access control section 27 and then returns a response to RW 10 (4). The started authentication application refers to the access control information and executes mutual authentication processing with RW 10 using the RW authentication information specified for the corresponding service application (5). When the authentication processing succeeds, RW 10 specifies AID of target service application 23 and requests a card application selection (6). The authentication processing has succeeded so that control section 22 of secure module 20 starts the service application specified by this card application selection request (7) and returns, when there is a response from the started service application (8), a response of the card application selection to RW 10 (9).

Next, processing of executing a service is performed between service execution section 12 of RW 10 and specified service application 23 (10).

Figure 16:
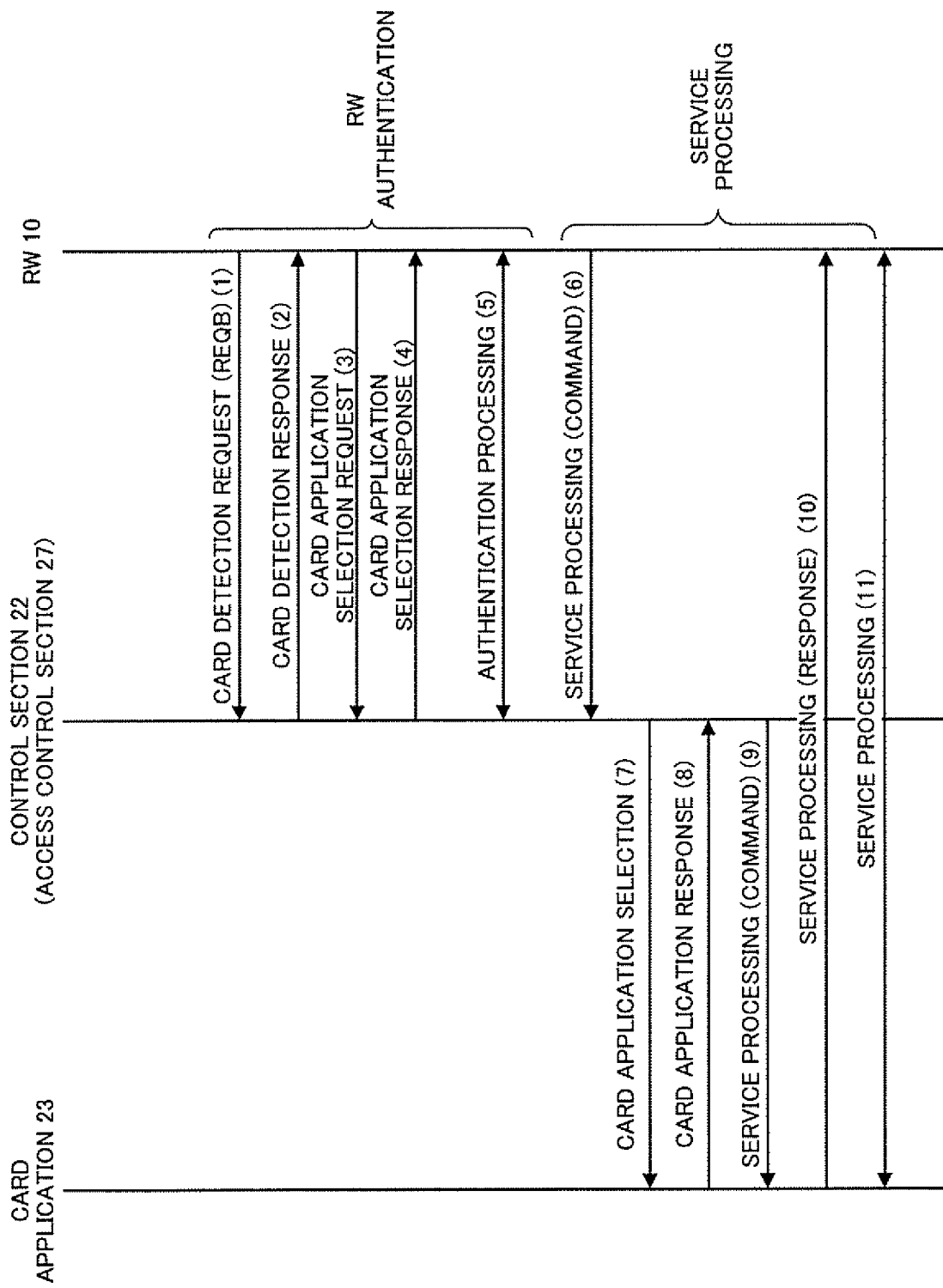
FIG. 16 is a flow chart showing second steps of imposing RW access limitation on a secure module according to Embodiment 7 of the present invention

Furthermore, FIG. 16 shows processing steps when AID of the authentication application is identical to AID of the card application.

RW 10 periodically transmits a request command (REQB) to detect approaching of the secure module to the communication area (1). When the user holds up secure module 20 over RW 10 and SM local wireless communication section 21 receives REQB, control section 22 replies through SM local wireless communication section 21 according to an anticollision procedure (2).

RW 10 specifies AID of a service application and sends a card application selection request (3), control section 22 starts the authentication application of the identical AID stored in access control section 27 and then returns a response to RW 10 (4). The started authentication application refers to the access control information and executes mutual authentication processing with RW 10 using the specified RW authentication information (5). Upon succeeding in the authentication processing, RW 10 transmits a service processing command to secure module 20 (6). The authentication processing has succeeded, so that control section 22 of secure module 20 starts the service application specified by the card application selection request (7). When there is a response from the started service application (8), a service command is sent to the service application (9) and the service application returns a response to RW 10 (10).

Next, the processing of executing a service is performed between service execution section 12 of RW 10 and specified service application 23 (11).

The program of this secure module 20 prescribes that control section 22 should execute a step of performing authentication processing with RW 10 and a step of permitting RW 10 to access service application 23 only when this authentication processing succeeds.

In this way, if RW 10 succeeds in the authentication with access control section 27, access to card application 23 becomes possible. Therefore, only legitimate RW 10 can know card application 23 stored in secure module 20.

The present application is based on Japanese Patent Application No. 2004-152943 filed on May 24, 2004, entire content of which is expressly incorporated by reference herein.

INDUSTRIAL APPLICABILITY

The secure module of the present invention can be used as a non-contact IC card used in many fields such as service industry, sales industry, circulation industry, production industry, manufacturing or the like and can be used not only in the card shape but also in various shapes such as chip shape or stick shape.

Furthermore, the secure module holder of the present invention can be used as an electronic purse holding one or a plurality of secure modules and can also be applied to devices having other functions together such as a cellular phone and PDF in which secure modules can be mounted.

The program of the present invention can be used to prescribe the operation of such a secure module holder and secure module.

The invention claimed is:

1. A program for causing a secure module holder that holds a secure module storing at least one card application and having a non-contact communicator that performs a non-contact communication with a reader/writer to execute:

disabling said non-contact communicator of said secure module in a phase in which said secure module is held;

returning, in a state where said non-contact communicator of said secure module is disabled, an error message to the reader/writer when a card application selection request for service is received from said reader/writer, and returning a card application selection response to the reader/writer when a card application selection request for authentication is received;

executing authentication processing with the reader/writer after returning the card application selection response to the reader/writer; and permitting the reader/writer to access the card application stored in said secure module when the card application selection request for service is received from the reader/writer after said non-contact communicator of said secure module is enabled.

2. A secure module holder that holds one or a plurality of secure modules storing at least one card application and having a non-contact communicator and controls a non-contact communication with a reader/writer, comprising:

the non-contact communicator that performs the non-contact communication with the reader/writer;

a contact communicator that performs a contact communication with said secure module;

an access controller that performs authentication processing with the reader/writer; and a controller that controls an operation of said secure module holder, wherein said controller:

disables said non-contact communicator of said secure module in a phase in which said secure module is held;

returns, in a state where said non-contact communicator of said secure module is disabled, an error message to the reader/writer when a card application selection request for service is received from the reader/writer, and returns a card application selection response to the reader/writer when a card application selection request for authentication is received;

executes the authentication processing with the reader/writer after returning the card application selection response to the reader/writer;

enables said non-contact communicator of said secure module when the authentication processing succeeds; and permits the reader/writer to access the card application stored in said secure module when the card application selection request for service is received from the reader/writer after said non-contact communicator of said secure module is enabled.

3. The secure module holder according to claim 2, wherein an application ID which is different from that of the card application is set in the authentication application of said access controller that performs the authentication processing with the reader/writer.

4. The secure module holder according to claim 2, wherein an application ID which is identical to that of the card application is set in the authentication application of said access controller that performs the authentication processing with the reader/writer.

5. A method for causing a secure module holder that holds a secure module storing at least one card application and having a non-contact communicator that performs a non-contact communication with a reader/writer to execute:

disabling the non-contact communicator of the secure module in a phase in which the secure module is held;

returning, in a state where the non-contact communicator of the secure module is disabled, an error message to the reader/writer when a card application selection request for service is received from the reader/writer, and returning a card application selection response to the reader/writer when a card application selection request for authentication is received;

executing authentication processing with the reader/writer after returning the card application selection response to the reader/writer; and permitting the reader/writer to access the card application stored in the secure module when the card application selection request for service is received from the reader/writer after the non-contact communicator of the secure module is enabled.

* * * * *